US012645855B2

(12) United States Patent
Kalla et al.

(10) Patent No.: US 12,645,855 B2
(45) Date of Patent: Jun. 2, 2026

(54) AUTOMATED VERIFICATION OF TECHNOLOGY SPECIFIC AND TECHNOLOGY INDEPENDENT LOGIC MODELS OF A MEMORY ARRAY

(71) Applicant: INTERNATIONAL BUSINESS MACHINES CORPORATION, Armonk, NY (US)

(72) Inventors: Thomas Kalla, Boeblingen (DE); Jentje Leenstra, Bondorf (DE); Richard Louis Henry Carbone, Webster, NY (US); Philipp Salz, Altdorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 917 days.

(21) Appl. No.: 17/955,653

(22) Filed: Sep. 29, 2022

(65) Prior Publication Data

US 2024/0111933 A1     Apr. 4, 2024

(51) Int. Cl.
*G06F 119/16*     (2020.01)
*G06F 30/3323*     (2020.01)
*G06F 30/34*     (2020.01)

(52) U.S. Cl.
CPC .......... *G06F 30/3323* (2020.01); *G06F 30/34* (2020.01); *G06F 2119/16* (2020.01)

(58) Field of Classification Search
CPC ... G06F 30/3323; G06F 30/34; G06F 2119/16
See application file for complete search history.

(56) References Cited

U.S. PATENT DOCUMENTS

| | | | |
|---|---|---|---|
| 6,378,112 B1 | 4/2002 | Martin | |
| 6,848,084 B1 * | 1/2005 | Pandey | G06F 30/33 |
| | | | 716/106 |
| 2006/0075375 A1 | 4/2006 | Rana | |
| 2010/0182042 A1 | 7/2010 | Law | |

(Continued)

FOREIGN PATENT DOCUMENTS

WO     2024/068450 A1     4/2024

OTHER PUBLICATIONS

"Uniquification", Wiktionary The free dictionary, last edited on Nov. 14, 2020, Printed Aug. 30, 2022, 1 page, <https://en.wiktionary.org/wiki/uniquification>.

(Continued)

*Primary Examiner* — Nghia M Doan
(74) *Attorney, Agent, or Firm* — Steven M. Bouknight

(57) ABSTRACT

A computer implemented method for automated generation and verification of a technology specific logic model and a technology independent logic model of a memory array, the method at least comprising: having a first set of parameters; having a set of constraints, creating a second set of parameters; generating the technology independent model of the memory array wherein the second set of parameters and the set of constraints are used; generating the technology specific model of the memory array wherein the first set of parameters and the set of constraints are used; verifying the technology independent model and the technology specific model for equivalence on a sequential logic basis.

25 Claims, 4 Drawing Sheets

150

(56)       References Cited

U.S. PATENT DOCUMENTS

2016/0246911 A1 *   8/2016   Subramaniam ..... G06F 30/3312

OTHER PUBLICATIONS

Blanchard, Anton, "A tiny Open Power ISA softcore written in VHDL 2008", Github, Printed Aug. 29, 2022, 12 pages, <https://github.com/antonblanchard/microwatt>.
Cong et al., "RASP: A General Logic Synthesis System for SRAM-based FPGAs", Proceedings of the Fourth International ACM Symposium on Field-Programmable Gate Arrays, Feb. 11-13, 1996, Napa Valley, CA, 7 pages, <https://cadlab.cs.ucla.edu/~cong/papers/fpga96_rasp.pdf>.
Havercamp, Frank, "NVMe_Host_Tech_Desc.pdf AT Master", Github, Printed Aug. 29, 2022, 16 pages, <https://github.com/open-power/snap/blob/master/hardware/doc/NVMe_Host_Tech_Desc.pdf>.
Laforest et al., "Composing Multi-Ported Memories on FPGAs", ACM Trans. Reconfig. Technol. Syst. 7, 3, Article 16, Aug. 2014, 23 pages <http://dx.doi.org/10.1145/2629629>.
Landis et al., "Language-Based Rapid Prototyping Methods for Legacy System Re-Engineering and Re-Use", Proceedings of the Tenth IEEE International Workshop on Rapid System Prototyping. Shortening the Path from Specification to Prototype, Jun. 16-18, 1999, 6 pages, <https://ieeexplore.ieee.org/abstract/document/779031>.
Van Slyke, Dirk, "New Open Accelerator Infrastructure (OAI) sub-project to launch within the OCP Server Project", Open Compute Project, Mar. 19, 2019, 6 pages, <https://www.opencompute.org/blog/new-open-accelerator-infrastructure-oai-sub-project-to-launch-within-the-ocp-server-project>.
Asaad et al., "A cycle-accurate, cycle-reproducible multi-FPGA system for accelerating multi-core processor Simulation", FPGA '12: Proceedings of the ACM/SIGDA international symposium on Field Programmable Gate Arrays, Feb. 22, 2012, pp. 153-162 doi: https://doi.org/10.1145/2145694.2145720.

* cited by examiner

AUTOMATED VERIFICATION OF TECHNOLOGY SPECIFIC AND TECHNOLOGY INDEPENDENT LOGIC MODELS OF A MEMORY ARRAY

The present invention relates in general to data processing systems, and in particular, to a computer implemented method, a computing environment and a computer program product for automated generation and verification of a technology specific logic model and a technology independent logic model of a memory array. The invention further relates to a method for designing a field programmable gate array (FPGA) processor model comprising at least a memory array.

BACKGROUND

To emulate a processor core on a field programmable gate array (FPGA), the problem arises to define a method and implementation for implementing the full custom arrays and register files on an FPGA that makes use of the FPGA primitives like block random access memory (BRAM) and register FPGA.

Methods have been disclosed for comparing design block views containing data representing self-timed circuits or a memory array to determine whether the compared design block views are logically equivalent.

Methods have also been disclosed for automated technology dependent transformations for CMOS digital design synthesis resulting in a combination of CMOS interconnected standard-cells from a target CMOS library being mapped and a transistor-level representation for the input design specification with the transistor level type and portion to be represented at the transistor level representation being chosen by a user. The transistor sizing and evaluation of the combination of said transistor-level representation and standard-cell being mapped iteratively to meet delay, size, and power constraints for CMOS.

Another disclosure includes a programmable transistor array circuit comprising a semiconductor substrate and a plurality of basic transistor units (BTUs) arranged in rows and columns of uniformly spaced cells, the BTUs further comprising PMOS transistor units (PTUs). NMOS transistor units (NTUs) and dummy transistor units (DTUs) each BTU having conductors arranged in a single direction running through the BTUs and the conductors being uniformly spaced with respect to each other. The arrangement of the BTUs is subject to restricted design rules. Logical transistor units (LTUs) are formed from the BTUs using first and second layers of metallization. Methods for producing integrated circuits are disclosed forming programmable transistor arrays and implementing customer specified system designs upon the programmable transistor arrays.

Other method disclosures present a memory optimization of integrated circuit (IC) design using generic memory models. One method includes accessing a register transfer level (RTL) description for the IC design that includes generic memory interface calls to generic memory models for each memory instance. The generic memory call interface includes a set of memory parameters. The method also includes processing the RTL description of the IC design as a step in a design flow for the IC design by processing specific memory models for the memory instances, wherein the specific memory model for each memory instance is generated from the generic memory model using the memory parameters corresponding to the memory instance. The method also includes generating specific memory models (e.g., simulation model, timing model, and layout model) for each memory instance based on a given set of values of memory parameters for the memory instance.

SUMMARY

A computer implemented method is proposed for automated generation and verification of a technology specific logic model and a technology independent logic model of a memory array. The method includes one or more processors accessing a first set of parameters comprising a technology specific logic description of the memory array. The one or more processors accessing a set of constraints comprising a logical behavior of the memory array. The one or more processors creating a second set of parameters out of the first set of parameters wherein the second set of parameters comprises a technology independent logic description of the memory array. The one or more processors generating the technology independent model of the memory array wherein the second set of parameters and the set of constraints are used. The one or more processors generating the technology specific model of the memory array wherein the first set of parameters and the set of constraints are used, and one or more processors verifying the technology independent model and the technology specific model for equivalence on a sequential logic basis.

The technology specific model, (e.g., for a microprocessor), enables an FPGA compatible version of that microprocessor, favoring an FPGA emulation for faster verification and faster production concerning time-to-market. An open-source version compatible with the customer FPGA flow may advantageously be used for FPGA emulation.

Verifying the technology independent model and the technology specific model for equivalence is based on a sequential logic basis. The criterion for equivalence requires demonstration that the two models deliver the same logic output when the same logic input is used in the same logic sequence. The technology independent model may not be as detailed as the technology specific model, but it exhibits the same logic behavior on a sequential logic basis. Thus, for emulation on an FPGA chip, the technology independent model of the memory array may advantageously be used instead of implementing the full technology specific model.

The technology independent model may result in a cycle simulation implemented in an FPGA. The technology independent model, also referred to as "abstract model," includes an advantageous attribute that enables equivalence checking. The procedure of equivalence checking speeds up development cycles by automatically generating/validating technology dependent arrays, which in turn speeds up processor development/verification.

The proposed method comprises a technology specific, very high-speed integrated circuit hardware description language (VHDL) part, and a technology independent VHDL part for modelling of the memory array. VHDL is just a favorable example for a register transfer language (RTL) used for description of the memory array.

At the interface between both parts, so called "generics" are used to define the FPGA implementation style as, for example, block random access memory (BRAM) or registers and their clock style. Furthermore, the read/write behavior, number of bits, entries, read/write ports, etc., are other generics that may serve as parameters.

Using sequential equivalence methods with constraints, the equivalence of function between the original full custom implementation of the array/register file in functional mode, (i.e., ignoring automated built-in self-test (ABIST)), scan, timing optimization etc., and the BRAM/register implementation on the FPGA, can be done step by step for reduced complexity.

The method is valid for a wide range of potential other uses of an intermediate representation, such that instead of the FPGA BRAM/register implementation, faster functional simulation can also be supported by using a more abstract model, with equivalence proof that the detailed model behavior can be met.

The proposed method exhibits significant advantages as compared to available memory compilers which do not fulfil the necessary requirements due to an inability to handle technology dependent models. According to aspects of the present invention, a new FPGA model use case can be derived from a technology specific model. Fully validated arrays may be generated using equivalence checking on a sequential logic basis.

In an embodiment of the present invention, additionally or alternatively, the proposed method may at least be repeated in a loop that includes the process steps of: creating the second set of parameters out of the first set of parameters, generating the technology independent model of the memory array, generating the technology specific model of the memory array, and verifying the technology independent model and the technology specific model for equivalence on a sequential logic basis, until the technology independent model and the technology specific model are equivalent. The recited method steps of the process may be repeated in a loop until the criterion for equivalence of the two models is fulfilled, which indicates that the two models deliver the same logic output when the same logic input is used in the same logic sequence. Thus, a sequential equivalence proven technology independent model may result from the inventive method for further synthesis of a memory array.

In an embodiment of the present invention, additionally or alternatively, a technology of the memory array may comprise at least one of an FPGA, an ASIC, a CMOS, and an abstract model technology. A variety of technologies may favorably be used for synthesis of the memory array.

In an embodiment of the present invention, additionally or alternatively, the first set of parameters may comprise at least one parameter selected from a group consisting of: a row width and/or depth, a number of rows, a number of read/write ports, input/output staging latches, a write-before-read behavior, a bit write enable, single versus multi pumped architecture, a memory technology type. The listing of parameters may describe technology dependent boundary conditions of the memory array. There may be other advantageous parameters that can be included, depending on the memory family under design.

In an embodiment of the present invention, additionally or alternatively, the set of constraints may comprise at least one constraint selected from a group consisting of: no read and write to same address at same time, single or multi pumped clocking, and address greater than a certain value is out of bounds. The list of constraints may describe further technology dependent boundary conditions of the memory array. Advantageously, there may be other constraints depending on the memory family under design.

Thus, given the set of array parameters and the set of constraints, the technology independent model may be generated in an RTL implementation.

In an embodiment of the present invention, additionally or alternatively, for verifying the technology independent model and the technology specific model for equivalence on a sequential logic basis, a general sequential logic checking tool may be used. A variety of supplier specific equivalence checking tools may be available for this purpose.

In an embodiment of the present invention, additionally or alternatively, at least the first set of parameters, the set of constraints, and the technology independent logic model may be used as an input for the sequential logic checking tool. Equivalence checking may be performed between the technology specific model and the technology independent model.

In an embodiment of the present invention, additionally or alternatively, the technology independent logic model may be compatible on a cycle simulation basis for sequential equivalency checking. The technology independent model may result from a cycle simulation implemented in an FPGA.

In an embodiment of the present invention, additionally or alternatively, cycle accurate models of specific technology components may be substituted into the technology independent model. The technology independent model may result from a cycle simulation implemented in an FPGA.

In an embodiment of the present invention, additionally or alternatively, the technology specific logic model and the technology independent logic model of the memory array may be represented in a register transfer language. VHDL may be a favorable example for a register transfer language (RTL) used for description of the memory array.

Furthermore, in an embodiment, a method is proposed for designing an FPGA processor model comprising at least a memory array, the method at least comprising an automated generation and verification of a technology specific logic model and a technology independent logic model of a memory array.

In an embodiment of the present invention, additionally or alternatively, the method may further include method steps comprising: accessing a first set of parameters comprising a technology specific logic description of the memory array, accessing a set of constraints comprising a logical behavior of the memory array, creating a second set of parameters out of the first set of parameters wherein the second set of parameters comprises a technology independent logic description of the memory array, generating the technology independent model of the memory array in which the second set of parameters and the set of constraints are used, generating the technology specific model of the memory array in which the first set of parameters and the set of constraints are used, and verifying the technology independent model and the technology specific model for equivalence on a sequential logic basis.

The proposed method for designing an FPGA processor model comprising at least a memory array may be used advantageously with the method for automated generation and verification of a technology specific logic model and a technology independent logic model of a memory array described above. Advantages of the proposed method may also be applied to the embodiment of the method for designing an FPGA processor model and may not be repeated for reasons of convenience.

In an embodiment of the present invention, additionally or alternatively, the proposed method for designing and FPGA processor model may at least be repeated in a loop including method steps comprising: creating the second set of parameters out of the first set of parameters, generating the technology independent model of the memory array, generating the technology specific model of the memory array, and verifying the technology independent model and the technology specific model for equivalence on a sequential logic basis, until the technology independent model and the technology specific model are equivalent. The process may be repeated in a loop until the criterion for equivalence of the two models is fulfilled in which the criterion for equivalence is met by the two models delivering the same logic output when the same logic input is used in the same logic sequence. As such, a proven sequential equivalence technology independent model may result from the inventive method for further synthesis of a memory array.

In an embodiment of the present invention, additionally or alternatively, a technology may comprise at least one of a FPGA, an ASIC, a CMOS, and an abstract model. A variety of technologies may be used for synthesis of the memory array.

In an embodiment of the present invention, additionally or alternatively, the first set of parameters may comprise at least one parameter selected from a group consisting of: a row width and/or depth, a number of rows, a number of read/write ports, input/output staging latches, a write-before-read behavior, a bit write enable, single versus multi pumped architecture, and a memory technology type. The list of parameters may describe technology dependent boundary conditions of the memory array. There may be other advantageous parameters depending on the memory family under design.

In an embodiment of the present invention, additionally or alternatively, the set of constraints may comprise at least one from a group that includes no read and write to same address at same time, single or multi pumped clocking, address greater than a certain value is out of bounds. The list of constraints may describe further technology dependent boundary conditions of the memory array. Advantageously, there may be other constraints depending on the memory family under design.

Thus, given the set of array parameters and the set of constraints, the technology independent model may be generated in an RTL implementation.

In an embodiment of the present invention, additionally or alternatively, a general sequential logic checking tool may be used for verifying the technology independent model and the technology specific model for equivalence on a sequential logic basis. A variety of supplier specific equivalence checking tools may be available for this purpose.

In an embodiment of the present invention, additionally or alternatively, at least the first set of parameters, the set of constraints and the technology independent logic model may be used as an input for the sequential logic checking tool. Equivalence checking may be performed between the technology specific model and the technology independent model.

In an embodiment of the present invention, additionally or alternatively, the technology independent logic model may be compatible on a cycle simulation basis for sequential equivalency checking. The technology independent model may result from a cycle simulation implemented in a FPGA.

In an embodiment of the present invention, additionally or alternatively, cycle accurate models of specific technology components may be substituted into the technology independent model. The technology independent model may result from a cycle simulation implemented in an FPGA.

In an embodiment of the present invention, additionally or alternatively, the technology specific logic model and the technology independent logic model of the memory array may be represented in a register transfer language. VHDL may be a favorable example for a register transfer language (RTL) used for description of the memory array.

Furthermore, a computing environment is proposed for automated generation and verification of a technology specific logic model and a technology independent logic model of a memory array. The computing environment includes a computer system including a computer-readable storage medium and program instructions stored on the computer-readable storage medium. The computer system further includes one or more processors that execute the program instructions stored on the computer-readable storage medium to perform a method at least comprising steps that include, accessing a first set of parameters comprising a technology specific logic description of the memory array, accessing a set of constraints comprising a logical behavior of the memory array, creating a second set of parameters out of the first set of parameters wherein the second set of parameters comprises a technology independent logic description of the memory array, generating the technology independent model of the memory array wherein the second set of parameters and the set of constraints are used, generating the technology specific model of the memory array wherein the first set of parameters and the set of constraints are used, and verifying the technology independent model and the technology specific model for equivalence on a sequential logic basis.

The proposed computer system of the computing environment for automated generation and verification of a technology specific logic model and a technology independent logic model of a memory array may advantageously be used with the method for automated generation and verification of a technology specific logic model and a technology independent logic model of a memory array described above. Advantages of the proposed method may also be applied to the embodiment of the computer system and may not be repeated for reasons of convenience.

In an embodiment of the present invention, additionally or alternatively, the computer implemented method may at least be repeated in a loop of process steps that include, creating the second set of parameters out of the first set of parameters, generating the technology independent model of the memory array, generating the technology specific model of the memory array, and verifying the technology independent model and the technology specific model for equivalence on a sequential logic basis, until the technology independent model and the technology specific model are equivalent. The process may be repeated in a loop until the criterion for equivalence of the two models is fulfilled, which includes demonstrating that the two models deliver the same logic output when the same logic input is used in the same logic sequence. Thus, a proven sequential equivalence technology independent model may result from the inventive method for further synthesis of a memory array.

Furthermore, a computer program product is proposed for automated generation and verification of a technology specific logic model and a technology independent logic model of a memory array.

The computer program product comprises at least one computer readable storage medium having program instructions embodied therewith, the program instructions, executable by a computer processor, cause the computer to perform a method at least comprising the steps, accessing a first set of parameters comprising a technology specific logic description of the memory array, accessing a set of constraints comprising a logical behavior of the memory array, creating a second set of parameters out of the first set of parameters wherein the second set of parameters comprises a technology independent logic description of the memory array, generating the technology independent model of the memory array wherein the second set of parameters and the set of constraints are used, generating the technology specific model of the memory array wherein the first set of parameters and the set of constraints are used, and verifying the technology independent model and the technology specific model for equivalence on a sequential logic basis.

The proposed computer program product advantageously may be used for implementing the method for automated generation and verification of a technology specific logic model and a technology independent logic model of a memory array as described above. Advantages of the proposed method may also be applied to the embodiment of the computer program product and may not be repeated for reasons of convenience.

Additionally, in an embodiment, a computer system for execution of a code block is proposed, comprising computer readable program instructions for performing the method described above.

BRIEF DESCRIPTION OF THE SEVERAL VIEWS OF THE DRAWINGS

The present disclosure, together with the above-mentioned and other objects and advantages, may best be understood from the following detailed description of the embodiments, but not restricted to the embodiments.

DETAILED DESCRIPTION

Figure 1:
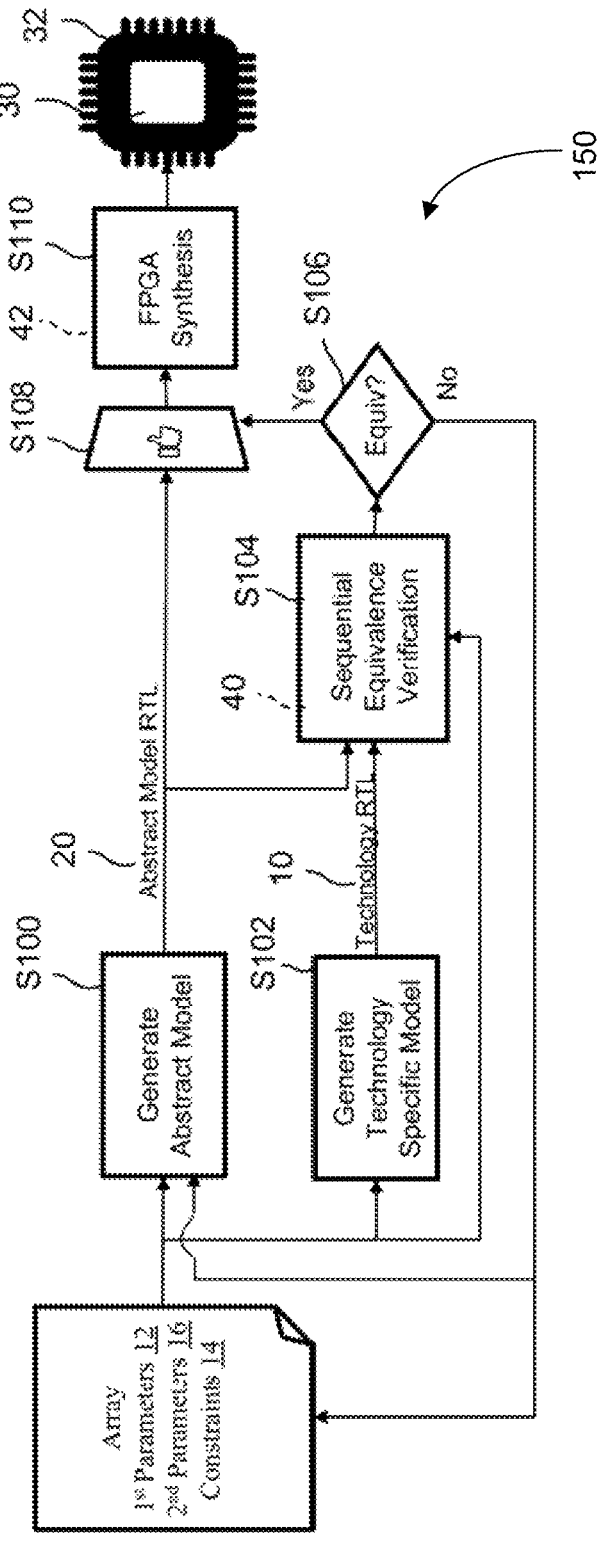
FIG. 1 depicts an overview of a computer implemented method for designing an FPGA processor model comprising at least a memory array, based on a method for automated generation and verification of a technology specific logic model and a technology independent logic model of the memory array, according to an embodiment of the invention.

Referring to the drawings, like elements are labelled with the same reference numerals. The drawings are merely schematic representations, not intended to portray specific parameters of the invention. Moreover, the drawings are intended to depict only typical embodiments of the invention and, therefore, should not be considered as limiting the scope of the invention.

The illustrative embodiments described herein provide a method for automated generation and verification of a technology specific logic model and a technology independent logic model of a memory array. The method comprises at least the following method steps that include, accessing a first set of parameters comprising a technology specific logic description of the memory array, accessing a set of constraints comprising a logical behavior of the memory array, creating a second set of parameters out of the first set of parameters wherein the second set of parameters comprises a technology independent logic description of the memory array, generating the technology independent model of the memory array wherein the second set of parameters and the set of constraints are used, generating the technology specific model of the memory array wherein the first set of parameters and the set of constraints are used, and verifying the technology independent model and the technology specific model for equivalence on a sequential logic basis.

The illustrative embodiments may further be used for a computer system for automated generation and verification of a technology specific logic model and a technology independent logic model of a memory array. The computer system performs a method comprising at least the following program instructions of method steps that include, accessing a first set of parameters comprising a technology specific logic description of the memory array, accessing a set of constraints comprising a logical behavior of the memory array, creating a second set of parameters out of the first set of parameters wherein the second set of parameters comprises a technology independent logic description of the memory array, generating the technology independent model of the memory array wherein the second set of parameters and the set of constraints are used, generating the technology specific model of the memory array wherein the first set of parameters and the set of constraints are used, and verifying the technology independent model and the technology specific model for equivalence on a sequential logic basis.

FIG. 1 depicts an overview of a computer implemented method 150, for designing an FPGA processor model 32 comprising at least a memory array 30 based on a method for automated generation and verification of a technology specific logic model 10 and a technology independent logic model 20 of the memory array 30 according to an embodiment of the invention.

As is depicted in FIG. 1, the method for designing the FPGA processor model 32 accesses (i.e., receiving or accessing from storage) a first set of parameters 12 comprising a technology specific logic description of the memory array 30 and a set of constraints 14 comprising a logical behavior of the memory array 30. The method creates a second set of parameters 16 out of the first set of parameters 12, wherein the second set of parameters 16 comprises a technology independent logic description of the memory array 30.

The technology may comprise at least one of an FPGA, an ASIC, a CMOS, and an abstract model technology.

The first set of parameters 12 may comprise at least one parameter selected from a group consisting of: a row width and/or depth, a number of rows, a number of read/write ports, input/output staging latches, a write-before-read behavior, a bit write enable, a single versus a multi pumped architecture, and a memory technology type, according to the technology used and depending on the memory family under design.

The set of constraints 14 may comprise at least one constraint selected from a group consisting of: no read and write to same address at same time, single or multi pumped clocking, and address greater than a certain value is out of bounds, depending on the memory family under design.

Step S100 utilizes the second set of parameters 16 and the set of constraints 14 to generate a technology independent model 20 of the memory array 30, also referred to as an/the abstract model.

In some embodiments, cycle accurate models of specific technology components may be substituted into the technology independent model 20.

An aspect of the invention includes compatibility on a cycle simulation basis for sequential equivalency checking of the technology independent logic model 20.

Step S102 generates a technology specific model 10 of the memory array 30 by use of the first set of parameters 12 and the set of constraints 14.

A register transfer language (RTL), such as very high-speed integrated circuit hardware description language (VHDL), represents both the technology specific logic model 10 as well as the technology independent logic model 20 of the memory array 30.

Step S104 verifies the technology independent model 20 and the technology specific model 10 for equivalence on a sequential logic basis.

Embodiments verify the equivalence of the technology independent model 20 and the technology specific model 10 based on a sequential logic basis. The criterion for equivalence of the two models requires that both models deliver the same logic output when the same logic input is used in the same logic sequence.

In some embodiments, a general sequential logic checking tool 40, available from various suppliers, may be used for performing verification of the technology independent model 20 and the technology specific model 10 for equivalence on a sequential logic basis.

The input for the sequential logic checking tool 40 includes at least the first set of parameters 12, the set of constraints 14, and the technology independent logic model 20.

According to the proposed method, sequential equivalence checking may be performed by repeating in a loop, repeating the elements of creating the second set of parameters 16 out of the first set of parameters 12, generating the technology independent model 20 of the memory array 30 in step S100, generating the technology specific model 10 of the memory array 10 in step S102, and verifying the technology independent model 20 and the technology specific model 10 for equivalence on a sequential logic basis in step S104. Step S106 performs equivalence checking on the output.

The process may be repeated in the loop until the criterion for equivalence of the two models 10, technology independent model 20 is fulfilled in which case the two models (i.e., technology specific model 10 and technology independent model 20) deliver the same logic output when using the same logic input in the same logic sequence.

If equivalence checking verifies the equivalence of the technology specific model 10 and technology independent model 20 are equivalent, then the process proceeds to step S108 in which the FPGA synthesis of step S110 receives technology independent model 20, in order to create the final memory array 30 of the FPGA processor model 32 by an FPGA synthesis tool 42.

If embodiments determine an absence of equivalence between technology specific model 10 and technology independent model 20, then the process returns to creating the second set of parameters 16, as well as generating the technology independent model 20 in step S100. Repetition of the process steps continues until the technology independent model 20 and the technology specific model 10 are equivalent. In an embodiment of the present invention, an integrated circuit may be built from the technology independent model 20.

Figure 2:
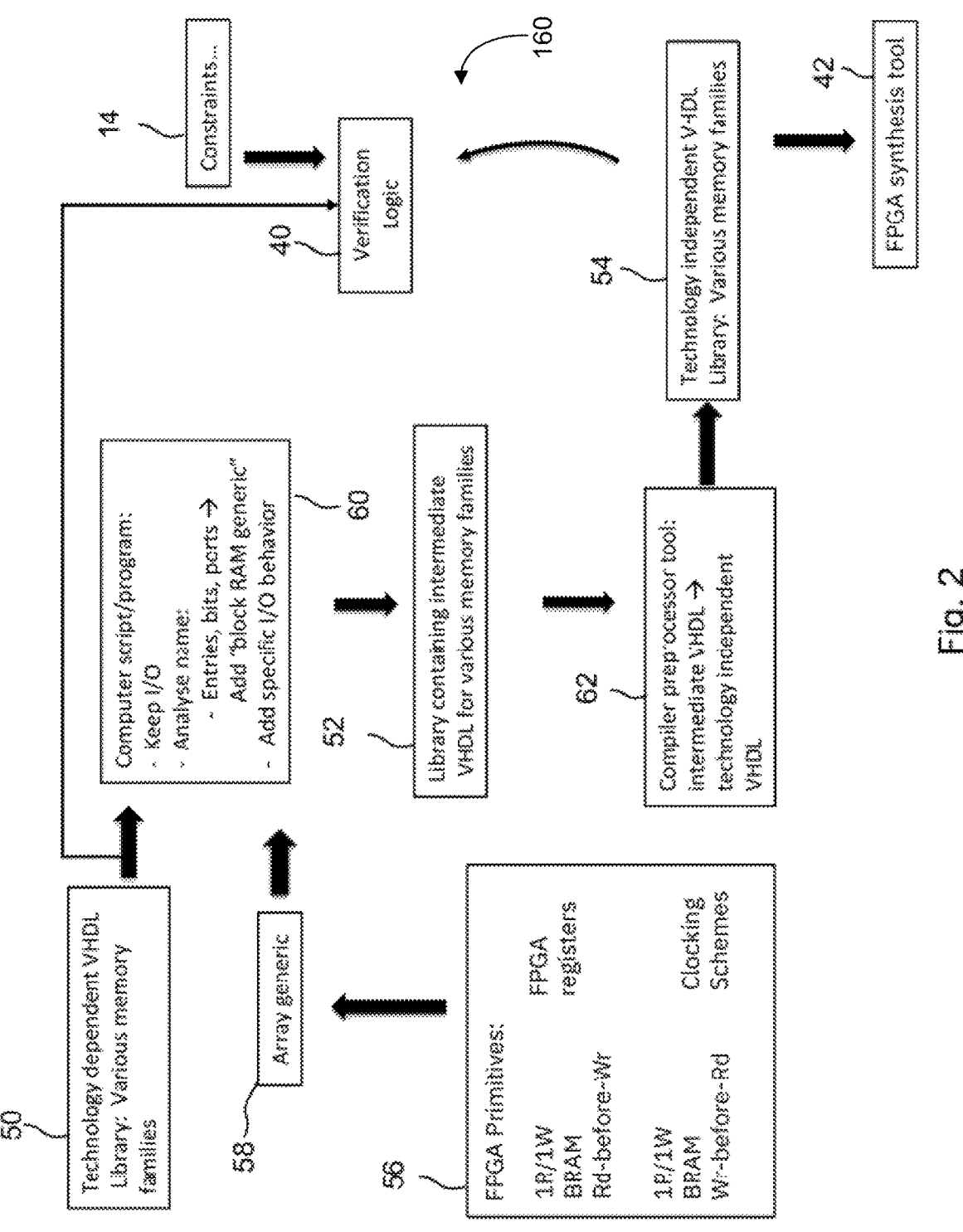
FIG. 2 depicts a tool flow of the method for automated generation and verification of a technology specific logic model and a technology independent logic model of the memory array, according to an embodiment of the invention.

FIG. 2 depicts a tool flow 160 of the method for automated generation and verification of a technology specific logic model 10 and a technology independent logic model 20 of the memory array 30 (FIG. 1), according to an embodiment of the invention.

The tool flow starts with FPGA primitives 56, comprising, for example, a plurality of read and write ports, BRAM, Read-before-Write, Write-before-Read, FPGA registers, and clocking schemes.

An array generic 58, for example, simulation run time optimized primitives, enables the replacement of the FPGA primitives 56 without changing the other steps. The array generic 58 is a VHDL that maps the array function on the FPGA primitives 56, based on the first set of parameters 12 (FIG. 1).

A computer script/program 60 receives the results of the array generic 58 together with input from a technology dependent VHDL library 50, resulting in an intermediate VHDL library 52. The computer script may, for example, include, keep I/O, analyse name for entries, bits, ports, resulting in add block RAM generic, and add specific I/O behavior.

Embodiments transform the resulting intermediate VHDL library 52 into a technology independent library 54 by a compiler pre-processor tool 62.

The sequential logic checking tool 40 uses the technology independent VHDL library 54 as well as the set of constraints 14 and the technology dependent VHDL library 50 as a verification logic input.

Input of the technology independent VHDL library 54 is used by the FPGA synthesis tool 42.

Figure 3:
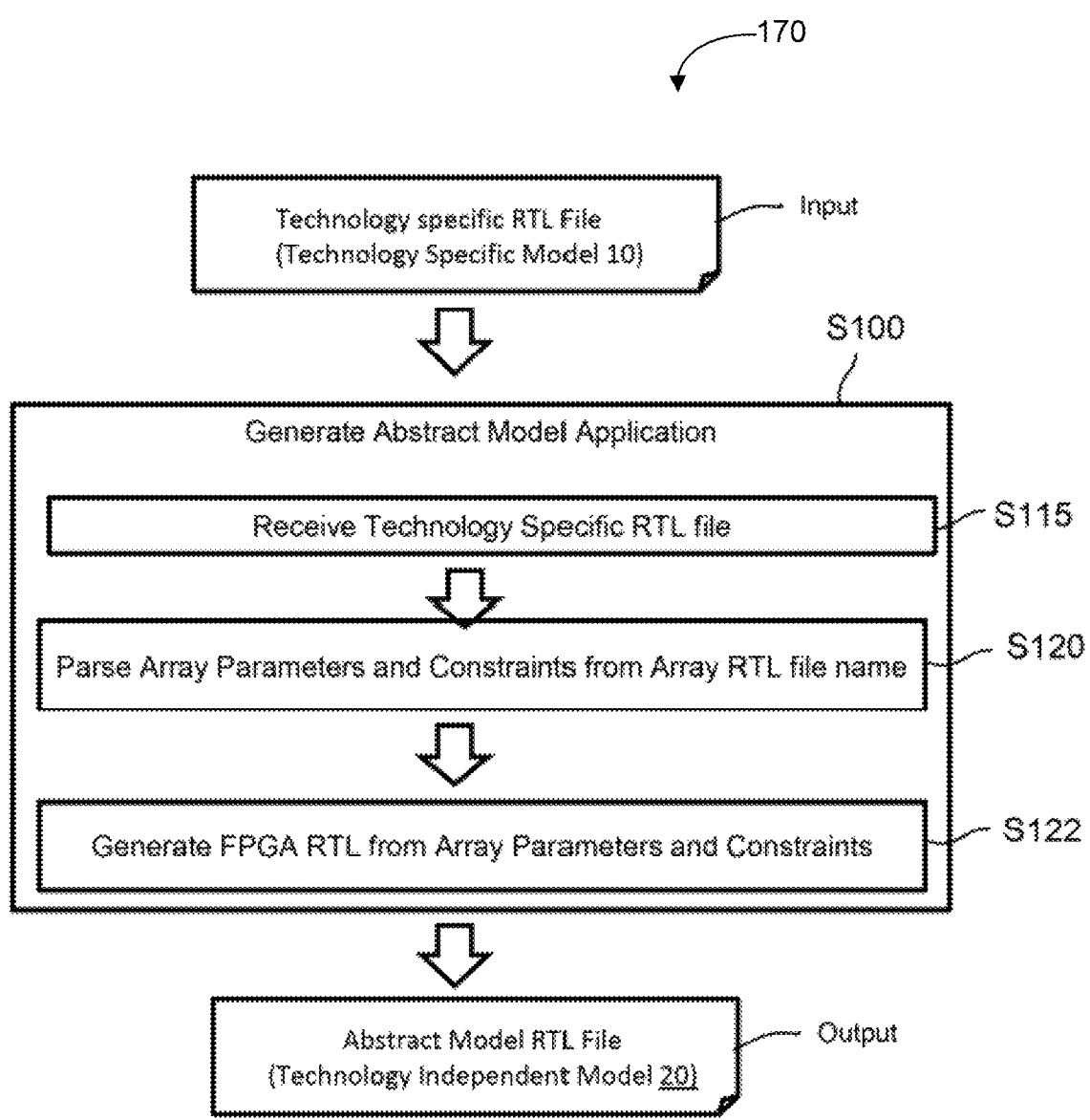
FIG. 3 depicts a flow chart for generating the technology independent logic model of the memory array, according to an embodiment of the invention.

FIG. 3 depicts a flow chart 170, for generating the technology independent logic model 20 of the memory array 30, according to an embodiment of the invention.

The flow begins with the technology specific model 10 (FIG. 1), represented by a technology specific RTL file, indicated as input to flow chart 170.

In step S100, which includes sub steps S115, S120, and S122, the technology independent model 20 is generated. Embodiments receive the technology specific RTL file, (i.e., technology specific model 10). Embodiments, in sub step S120, perform parsing of the array parameters from the first set of parameters 12 (FIG. 1) and parsing of the constraints from the set of constraints 14 (FIG. 1), according to the array RTL file name.

Embodiments, in step S122, generate an FPGA RTL from the array parameters and constraints, leading to the technology independent model 20 represented by an abstract model RTL file, depicted as an output.

Figure 4:
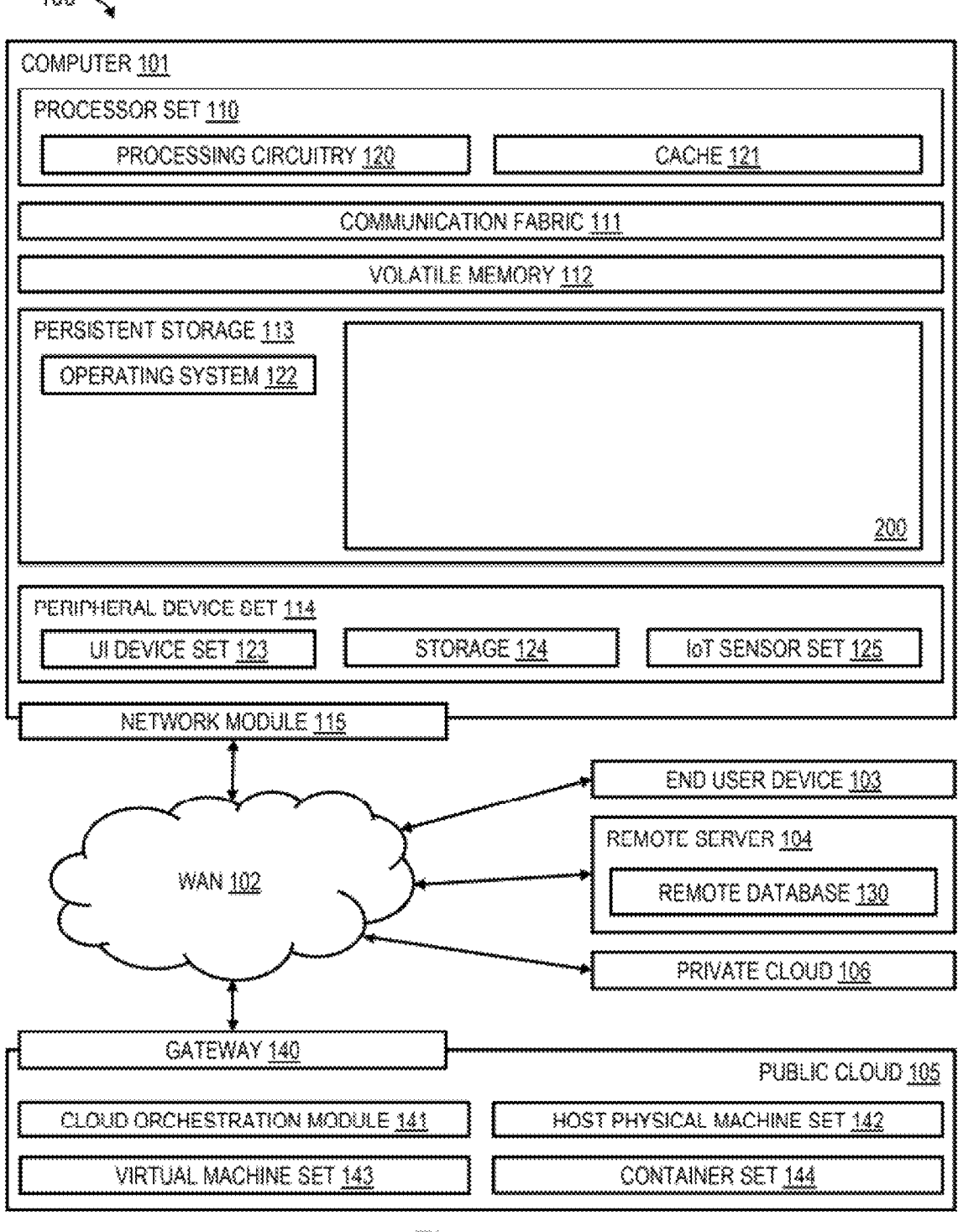
FIG. 4 depicts an example embodiment of a computer system of a computing environment for executing a method according to an embodiment of the invention.

In some embodiments of the present invention, a computing system 100, as depicted in FIG. 4, may be used for implementing the proposed method for automated generation and verification of a technology specific logic model 10 and a technology independent logic model 20 of a memory array 30. Computing system 100 may perform the method as described in FIGS. 1, 2, and 3.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, and depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" includes any tangible device that can retain and store computer-readable instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but the normal operations do not render the storage device as transitory because the data is not transitory while it is stored.

Referring now to FIG. 4, a schematic of an example of a computer system 100 is shown. Computer system 100 contains an example of a system for the execution of at least some of the computer code involved in performing the inventive methods, such as the code stored in block 200 for automated generation and verification of a technology specific logic model 10 and a technology independent logic model 20 of a memory array 30. In addition to block 200, computer system 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computer system 100, detailed discussion is focused on a single computer, specifically computer 101, to keep the presentation as simple as possible. Computer 101 may be located in a cloud, even though it is not shown in a cloud in FIG. 4. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computer systems, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing system 100, at least some of the instructions for performing the inventive methods may be stored in block 200 in persistent storage 113.

COMMUNICATION FABRIC 111 are the signal conduction paths that allow the various components of computer 101 to communicate with each other. Typically, the fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further exemplary embodiments of the present disclosure are set out in the following numbered clauses:

Numbered clause 1: A computer implemented method for automated generation and verification of a technology specific logic model (10) and a technology independent logic model (20) of a memory array (30), the method at least comprising: accessing a first set of parameters (12) comprising a technology specific logic description of the memory array (30), accessing a set of constraints (14) comprising a logical behavior of the memory array (30), creating a second set of parameters (16) out of the first set of parameters (12) wherein the second set of parameters (16) comprises a technology independent logic description of the memory array (30), generating the technology independent model (20) of the memory array (30) wherein the second set of parameters (16) and the set of constraints (14) are used, generating the technology specific model (10) of the memory array (30) wherein the first set of parameters (12) and the set of constraints (14) are used, and verifying the technology independent model (20) and the technology specific model (10) for equivalence on a sequential logic basis.

Numbered clause 2: The computer implemented method according to clause 1, wherein the method of claim 1 repeats steps of the method in a loop comprising: creating the second set of parameters (16) out of the first set of parameters (12), generating the technology independent model (20) of the memory array (30), generating the technology specific model (10) of the memory array (30), and verifying the technology independent model (20) and the technology specific model (10) for equivalence on a sequential logic basis, until the technology independent model (20) and the technology specific model (10) resulting outputs are equivalent.

Numbered clause 3: The computer implemented method according to clause 1 or 2, wherein a technology of the memory array (30) comprises at least one technology selected from a group consisting of an FPGA, an ASIC, a CMOS, and an abstract model technology.

Numbered clause 4: The computer implemented method according to any one of clauses 1 to 3, wherein the first set of parameters (12) comprises at least one parameter selected from a group consisting of a row width and/or depth, a number of rows, a number of read/write ports, input/output staging latches, a write-before-read behavior, a bit write enable, single versus multi pumped architecture, a memory technology type.

Numbered clause 5: The computer implemented method according to any one of clauses 1 to 4, wherein the set of constraints (14) comprises at least one constraint selected from a group consisting of no read and write to same address at same time, single or multi pumped clocking, and address greater than a certain value is out of bounds.

Numbered clause 6: The computer implemented method according to any one of clauses 1 to 5, wherein a general sequential logic checking tool (40) is used for verifying the technology independent model (20) and the technology specific model (10) for equivalence on a sequential logic basis.

Numbered clause 7: The computer implemented method according to clause 6, wherein at least the first set of parameters (12), the set of constraints (14), and the technology independent logic model (20) is used as an input for the sequential logic checking tool (40).

Numbered clause 8: The computer implemented method according to clause 7, wherein the technology independent logic model (20) is compatible on a cycle simulation basis for sequential equivalency checking.

Numbered clause 9: The computer implemented method according to clause 8, wherein cycle accurate models of specific technology components are substituted into the technology independent model (20).

Numbered clause 10: The computer implemented method according to any one of clauses 1 to 9, wherein the technology specific logic model (10) and the technology independent logic model (20) of the memory array (30) are represented in a register transfer language.

Numbered clause 11: A computer implemented method for designing a processor model (32) comprising at least a memory array (30), the method at least comprising an automated generation and verification of a technology specific logic model (10) and a technology independent logic model (20) of a memory array (30) according to any one of clauses 1 to 10. The method comprising: accessing a first set of parameters (12) comprising a technology specific logic description of the memory array (30), accessing a set of constraints (14) comprising a logical behavior of the memory array (30), creating a second set of parameters (16) out of the first set of parameters (12) wherein the second set of parameters (16) comprises a technology independent logic description of the memory array (30), generating a technology independent model (20) of the memory array (30) wherein the second set of parameters (16) and the set of constraints (14) are used, generating a technology specific model (10) of the memory array (30) wherein the first set of parameters (12) and the set of constraints (14) are used, and verifying the technology independent model (20) and the technology specific model (10) for equivalence on a sequential logic basis.

Numbered clause 12: The computer implemented method according to clause 11, wherein the method is performed in a loop repeating steps of the method comprising: creating the second set of parameters (16) out of the first set of parameters (12), generating the technology independent model (20) of the memory array (30), generating the technology specific model (10) of the memory array (10), and verifying the technology independent model (20) and the technology specific model (10) for equivalence on a sequential logic basis, until the technology independent model (20) and the technology specific model (10) are equivalent.

Numbered clause 13: The computer implemented method according to clauses 11 or 12, wherein a technology comprises at least one technology selected from a group consisting of an FPGA, an ASIC, a CMOS, and an abstract model technology.

Numbered clause 14: The computer implemented method according to any one of clauses 11 to 13, wherein the first set of parameters (12) comprises at least one parameter selected from a group consisting of a row width and/or depth, a number of rows, a number of read/write ports, input/output staging latches, a write-before-read behavior, a bit write enable, single versus multi pumped architecture, and a memory technology type.

Numbered clause 15: The computer implemented method according to any one of clauses 11 to 14, wherein the set of constraints (14) comprises at least one constraint selected from a group consisting of no read and write to same address at same time, single or multi pumped clocking, and an address greater than a certain value is out of bounds.

Numbered clause 16: The computer implemented method according to any one of clauses 11 to 15, wherein a general sequential logic checking tool (40) performs an equivalency verification between the technology independent model (20) and the technology specific model (10) based on a sequential logic basis.

Numbered clause 17: The computer implemented method according to clause 16, wherein an input for the sequential logic checking tool (40) includes at least the first set of parameters (12), the set of constraints (14), and the technology independent logic model (20).

Numbered clause 18: The computer implemented method according to clause 17, wherein the technology independent logic model (20) is compatible on a cycle simulation basis for sequential equivalency checking.

Numbered clause 19: The computer implemented method according to clause 18, wherein the sequential equivalency checking includes compatibility of the technology independent logic model on a cycle simulation basis.

Numbered clause 20: The computer implemented method according to any one of clauses 11 to 19, wherein a register transfer language represents the technology specific logic model (10) and the technology independent logic model (20) of the memory array (30).

Numbered clause 21: A computer system (100) for automated generation and verification of a technology specific logic model (10) and a technology independent logic model (20) of a memory array (30), wherein the computer system (100) comprises: one or more computer processors, at least one computer readable storage medium, and program instructions stored on the at least one computer readable storage medium that when executed by the one or more computer processors performs a method at least comprising: accessing a first set of parameters (12) comprising a technology specific logic description of the memory array (30), accessing a set of constraints (14) comprising a logical behavior of the memory array (30), creating a second set of parameters (16) out of the first set of parameters (12) wherein the second set of parameters (16) comprises a technology independent logic description of the memory array (30), generating the technology independent model (20) of the memory array (30) wherein the second set of parameters (16) and the set of constraints (14) are used, generating the technology specific model (10) of the memory array (30) wherein the first set of parameters (12) and the set of constraints (14) are used, and verifying the technology independent model (20) and the technology specific model (10) for equivalence on a sequential logic basis.

Numbered clause 22: The computer system according to clause 21, wherein the system performs program instructions of the method in a loop repeating program instructions comprising: creating the second set of parameters (16) out of the first set of parameters (12), generating the technology independent model (20) of the memory array (30), generating the technology specific model (10) of the memory array (30), and verifying the technology independent model (20) and the technology specific model (10) for equivalence on a sequential logic basis, until the technology independent model (20) and the technology specific model (10) are equivalent.

Numbered clause 23: A computer program product for automated generation and verification of a technology specific logic model (10) and a technology independent logic model (20) of a memory array (30), the computer program product comprising a computer readable storage medium having program instructions embodied therewith, the program instructions executable by a computer (101) to cause the computer (101) to perform a method comprising: accessing a first set of parameters (12) comprising a technology specific logic description of the memory array (30), accessing a set of constraints (14) comprising a logical behavior of the memory array (30), creating a second set of parameters (16) out of the first set of parameters (12) wherein the second set of parameters (16) comprises a technology independent logic description of the memory array (30), generating the technology independent model (20) of the memory array (30) wherein the second set of parameters (16) and the set of constraints (14) are used, generating the technology specific model (10) of the memory array (30) wherein the first set of parameters (12) and the set of constraints (14) are used, and verifying the technology independent model (20) and the technology specific model (10) for equivalence on a sequential logic basis.

Numbered clause 24: The computer program product according to clause 23, wherein program instructions substitute cycle accurate models of specific technology components into the technology independent model.

Numbered clause 25: A computer system (100) for designing an processor model (32) comprising at least a memory array (30), the method at least comprising an automated generation and verification of a technology specific logic model (10) and a technology independent logic model (20) of a memory array (30), the method comprising:

one or more computer processors;

at least one computer-readable storage medium and program instructions stored on the at least one computer-readable storage medium that when executed by the one or more processors performs a method comprising:

accessing a first set of parameters (12) comprising a technology specific logic description of the memory array (30);

accessing a set of constraints (14) comprising a logical behavior of the memory array (30);

creating a second set of parameters (16) out of the first set of parameters (12) wherein the second set of parameters (16) comprises a technology independent logic description of the memory array (30);

generating a technology independent model of the memory array (20), wherein the second set of parameters (16) and the set of constraints (14) are used;

generating a technology specific model (10) of the memory array (30), wherein the first set of parameters (12) and the set of constraints (14) are used; and verifying the technology independent model (20) and the technology specific model (20) for equivalence on a sequential logic basis.

The invention claimed is:

1. A computer-implemented method for automated generation and verification of a technology specific logic model and a technology independent logic model of a memory array, the method at least comprising:

accessing, by one or more processors, a first set of parameters comprising a technology specific logic description of the memory array;

accessing, by the one or more processors, a set of constraints comprising a logical behavior of the memory array;

creating, by the one or more processors, a second set of parameters out of the first set of parameters wherein the second set of parameters comprises a technology independent logic description of the memory array;

generating, by the one or more processors, a technology independent model of the memory array wherein the second set of parameters and the set of constraints are used;

generating, by the one or more processors, a technology specific model of the memory array wherein the first set of parameters and the set of constraints are used; and verifying, by the one or more processors, the technology independent model and the technology specific model for equivalence on a sequential logic basis.

2. The method according to claim 1, wherein method steps repeated in a loop at least comprises:

creating, by the one or more processors, the second set of parameters out of the first set of parameters; generating, by one or more processors, the technology independent model of the memory array, generating, by the one or more processors, the technology specific model of the memory array, and verifying, by the one or more processors, the technology independent model and the technology specific model for equivalence on a sequential logic basis, until the technology independent model and the technology specific model are equivalent.

3. The method according to claim 1, wherein a technology of the memory array comprises at least one selected from a group consisting of an FPGA, an ASIC, a CMOS, and an abstract model technology.

4. The method according to claim 1, wherein the first set of parameters comprises at least one parameter selected from a group consisting of a row width and/or depth, a number of rows, a number of read/write ports, input/output staging latches, a write-before-read behavior, a bit write enable, single versus multi pumped architecture, and a memory technology type.

5. The method according to claim 1, wherein the set of constraints comprises at least one constraint selected from a group consisting of no read and write to same address at same time, single or multi pumped clocking, address greater than a certain value is out of bounds.

6. The method according to claim 1, wherein performing verification of the equivalence between the technology independent model and the technology specific model includes use of a general sequential logic checking tool.

7. The method according to claim 6, wherein at least the first set of parameters, the set of constraints, and the technology independent logic model are used as an input for the sequential logic checking tool.

8. The method according to claim 1, wherein the technology independent logic model is compatible on a cycle simulation basis for sequential equivalency checking.

9. The method according to claim 1, wherein cycle accurate models of specific technology components are substituted into the technology independent model.

10. The method according to claim 1, wherein the technology specific logic model and the technology independent logic model of the memory array are represented in a register transfer language (RTL).

11. A computer-implemented method for designing a processor model comprising at least a memory array, the method at least comprising an automated generation and verification of a technology specific logic model and a technology independent logic model of a memory array, the method comprising:

accessing, by one or more processors, a first set of parameters comprising a technology specific logic description of the memory array;

accessing, by the one or more processors, a set of constraints comprising a logical behavior of the memory array;

creating, by the one or more processors, a second set of parameters out of the first set of parameters wherein the second set of parameters comprises a technology independent logic description of the memory array;

generating, by the one or more processors, a technology independent model of the memory array wherein the second set of parameters and the set of constraints are used;

generating, by the one or more processors, a technology specific model of the memory array wherein the first set of parameters and the set of constraints are used; and verifying, by the one or more processors, the technology independent model and the technology specific model for equivalence on a sequential logic basis.

12. The method according to claim 11, wherein the method repeats in a loop of method steps at least comprising:

creating, by the one or more processors, the second set of parameters out of the first set of parameters;

generating, by the one or more processors, the technology independent model of the memory array;

generating, by the one or more processors, the technology specific model of the memory array; and verifying, by the one or more processors, the technology independent model and the technology specific model for equivalence on a sequential logic basis, until the technology independent model and the technology specific model are equivalent.

13. The method according to claim 11, wherein a technology comprises at least one technology selected from a group consisting of an FPGA, an ASIC, a CMOS, and an abstract model technology.

14. The method according to claim 11, wherein the first set of parameters comprises at least one parameter selected from a group consisting of a row width and a row depth, a row width or a row depth, a number of rows, a number of read/write ports, input/output staging latches, a write-before-read behavior, a bit write enable, single versus multi pumped architecture, and a memory technology type.

15. The method according to claim 11, wherein the set of constraints comprises at least one constraint selected from a group consisting of no read and write to same address at same time, single or multi pumped clocking, and an address greater than a certain value is out of bounds.

16. The method according to claim 11, wherein a general sequential logic checking tool is used for verifying the technology independent model and the technology specific model for equivalence on a sequential logic basis.

17. The method according to claim 16, wherein as an input for the sequential logic checking tool at least the first set of parameters, the set of constraints and the technology independent logic model is used.

18. The method according to claim 11, wherein the technology independent logic model is compatible on a cycle simulation basis for sequential equivalency checking.

19. The method according to claim 11, wherein cycle accurate models of specific technology components are substituted into the technology independent model.

20. The method according to claim 11, wherein the technology specific logic model and the technology independent logic model of the memory array are represented in a register transfer language.

21. A computer system for automated generation and verification of a technology specific logic model and a technology independent logic model of a memory array, the computer system comprising:

one or more computer processors;

at least one computer-readable storage medium and program instructions stored on the at least one computer-readable storage medium that when executed by the one or more processors performs a method comprising:

accessing a first set of parameters comprising a technology specific logic description of the memory array;

accessing a set of constraints comprising a logical behavior of the memory array;

creating a second set of parameters out of the first set of parameters wherein the second set of parameters comprises a technology independent logic description of the memory array;

generating the technology independent model of the memory array wherein the second set of parameters and the set of constraints are used;

generating the technology specific model of the memory array wherein the first set of parameters and the set of constraints are used;

verifying the technology independent model and the technology specific model for equivalence on a sequential logic basis.

22. The computer system according to claim 21, wherein program instructions repeating in a loop at least comprising:

creating the second set of parameters out of the first set of parameters;

generating the technology independent model of the memory array;

generating the technology specific model of the memory array; and verifying the technology independent model and the technology specific model for equivalence on a sequential logic basis, until the technology independent model and the technology specific model are equivalent.

23. A computer program product for automated generation and verification of a technology specific logic model and a technology independent logic model of a memory array, the computer program product comprising:

a computer readable storage medium having program instructions embodied therewith, the program instructions executable by a computer to cause the computer to perform a method, comprising:

accessing a first set of parameters comprising a technology specific logic description of the memory array;

accessing a set of constraints comprising a logical behavior of the memory array;

creating a second set of parameters out of the first set of parameters wherein the second set of parameters comprises a technology independent logic description of the memory array;

generating the technology independent model of the memory array wherein the second set of parameters and the set of constraints are used;

generating the technology specific model of the memory array wherein the first set of parameters and the set of constraints are used; and verifying the technology independent model and the technology specific model for equivalence on a sequential logic basis.

24. The computer program product of claim 23, wherein cycle accurate models of specific technology components are substituted into the technology independent model.

25. A computer system for designing a processor model comprising at least a memory array, the method at least comprising an automated generation and verification of a technology specific logic model and a technology independent logic model of a memory array, the method comprising:

one or more computer processors;

at least one computer-readable storage medium and program instructions stored on the at least one computer-readable storage medium that when executed by the one or more processors performs a method comprising:

accessing, by one or more processors, a first set of parameters comprising a technology specific logic description of the memory array;

accessing, by the one or more processors, a set of constraints comprising a logical behavior of the memory array;

creating, by the one or more processors, a second set of parameters out of the first set of parameters wherein the second set of parameters comprises a technology independent logic description of the memory array;

generating, by the one or more processors, a technology independent model of the memory array wherein the second set of parameters and the set of constraints are used;

generating, by the one or more processors, a technology specific model of the memory array wherein the first set of parameters and the set of constraints are used; and verifying, by the one or more processors, the technology independent model and the technology specific model for equivalence on a sequential logic basis.

\* \* \* \* \*